US010699425B2

(12) United States Patent
Kondo

(10) Patent No.: US 10,699,425 B2
(45) Date of Patent: Jun. 30, 2020

(54) FEATURE IMPRESSION AXIS DETERMINATION SYSTEM, FEATURE IMPRESSION AXIS DETERMINATION METHOD, AND PROGRAM THEREOF

(71) Applicant: FUJIFILM Corporation, Tokyo (JP)

(72) Inventor: Hirokazu Kondo, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 257 days.

(21) Appl. No.: 15/917,846

(22) Filed: Mar. 12, 2018

(65) Prior Publication Data

US 2018/0268560 A1 Sep. 20, 2018

(30) Foreign Application Priority Data

Mar. 15, 2017 (JP) ................................. 2017-049942

(51) Int. Cl.
*G06T 7/33* (2017.01)
*G06T 7/32* (2017.01)
(Continued)

(52) U.S. Cl.
CPC ............ *G06T 7/33* (2017.01); *G06K 9/00684* (2013.01); *G06T 7/32* (2017.01); *G06T 11/60* (2013.01)

(58) Field of Classification Search
CPC .. G06T 11/60; G06T 7/33; G06T 7/32; H04N 1/00196; G06Q 50/01; G06K 9/00684
(Continued)

(56) References Cited

U.S. PATENT DOCUMENTS 8,626,762 B2 * 1/2014 Seung ................. G06F 3/04883
707/736
2002/0075324 A1 * 6/2002 Combs ................... G06F 16/58
715/848
(Continued)

FOREIGN PATENT DOCUMENTS

JP 2001-195579 7/2001
JP 2003-036387 2/2003
(Continued)

OTHER PUBLICATIONS

Zhao, Sicheng, et al. "Exploring principles-of-art features for image emotion recognition." Proceedings of the 22nd ACM international conference on Multimedia. ACM, 2014. (Year: 2014).*
(Continued)

Primary Examiner — Geoffrey E Summers
(74) Attorney, Agent, or Firm — JCIPRNET

(57) ABSTRACT

Provided are a feature impression axis determination system, a feature impression axis determination method, and a program thereof capable of determining a feature axis indicating features of a plurality of images. A plurality of images is input, and a standard impression value of each of the plurality of images is determined with respect to at least two standard impression axes. The determined standard impression values are plotted in a standard impression region. In the standard region defined by the two standard impression axes, an axis on which a variance of the standard impression values becomes a maximum is determined as a feature impression axis indicating features of the plurality of input images. The determined feature impression axis is displayed in the standard region.

9 Claims, 13 Drawing Sheets

(51) Int. Cl.
*G06T 11/60* (2006.01)
*G06K 9/00* (2006.01)

(58) Field of Classification Search
USPC .......................................................... 382/305
See application file for complete search history.

(56) References Cited

U.S. PATENT DOCUMENTS

| | | | | |
|---|---|---|---|---|
| 2009/0049083 | A1* | 2/2009 | Paschalakis | G06F 16/54 |
| 2011/0129159 | A1* | 6/2011 | Cifarelli | G06K 9/6226 |
| | | | | 382/224 |

FOREIGN PATENT DOCUMENTS

| | | |
|---|---|---|
| JP | 2005-099943 | 4/2005 |
| JP | 2015-162850 | 9/2015 |

OTHER PUBLICATIONS

Datta, Ritendra, et al. "Studying aesthetics in photographic images using a computational approach." European conference on computer vision. Springer, Berlin, Heidelberg, 2006. (Year: 2006).*

Jindo, Tomio, and Kiyomi Hirasago. "Application studies to car interior of Kansei engineering." International journal of industrial ergonomics 19.2 (1997): 105-114. (Year: 1997).*

Lu, Xin, et al. "On shape and the computability of emotions." Proceedings of the 20th ACM international conference on Multimedia. ACM, 2012. (Year: 2012).*

Walsh, Bruce. "Covariance, Regression, and Correlation" [PDF document]. University of Arizona, EEB 581. Retrieved from http://nitro.biosci.arizona.edu/courses/EEB581-2006/handouts/bivdistrib.pdf. (Year: 2006).*

Shinpei Masuda, et al., "Individual Preference Identification to Face Image with Subjective Meta Information", The 22nd Annual Conference of the Japanese Society for Artificial Intelligence, Jun. 11-13, 2008, 3G1-4, pp. 1-4.

"Office Action of Japan Counterpart Application," with English translation thereof, dated Jan. 28, 2020, p. 1-p. 6.

* cited by examiner

FEATURE IMPRESSION AXIS DETERMINATION SYSTEM, FEATURE IMPRESSION AXIS DETERMINATION METHOD, AND PROGRAM THEREOF

CROSS-REFERENCE TO RELATED APPLICATIONS

The present application claims priority under 35 U.S.C. § 119 to Japanese Patent Application No. 2017-049942, filed Mar. 15, 2017. Each of the above application(s) is hereby expressly incorporated by reference, in its entirety, into the present application.

BACKGROUND OF THE INVENTION

1. Field of the Invention

The present invention relates to a feature impression axis determination system, a feature impression axis determination method, and a program thereof.

2. Description of the Related Art

A technique that creates a postcard, an electronic album, a photo book, or the like using a plurality of images has been proposed. As such a technique, there is a technique in which in a case where a synthetic image is generated by attaching a target image to a template image, in order to match a final impression with a user's preference, a final impression of the synthetic image is designated by a user, a template image and a target image that are close to the designated impression are determined, and the target image is corrected to be close to the impression (JP2015-162850A). Further, with respect to evaluation of an image, there are a technique that performs emotional evaluation using adjectives (JP2001-195579A), a technique that generates designs in accordance with the customer's preferences (JP2005-99943A), and a technique that evaluates impressions of faces (JP2003-36387).

SUMMARY OF THE INVENTION

However, in the technique disclosed in JP2015-162850A, since the template image and the target image are determined to become an impression preferred by a user, it is not possible to determine an impression axis indicating features of a plurality of images. Further, since the technique disclosed in JP2001-195579A merely performs the emotional evaluation using adjectives, the technique disclosed in JP2005-99943A generates designs in accordance with the customer's preferences according, and the technique disclosed in JP2003-36387A evaluates impressions of faces, there is no disclosure relating to determining an impression axis indicating feature of a plurality of images.

An object of the invention is to provide a technique that can determine a feature impression axes indicating features of a plurality of images.

A feature impression axis determination system according to the invention comprises: an image input device (image input means) for inputting a plurality of images; a standard impression value determination device (standard impression value determination means) for determining a standard impression value of each of the plurality of images input through the image input device with respect to at least two standard impression axes; and a feature impression axis determination device (feature impression axis determination means) for determining an axis on which a variance of the standard impression values determined by the standard impression value determination device becomes a maximum in a standard region defined by the at least two standard impression axes as a feature impression axis indicating features of the plurality of images input through the image input device.

The invention also provides a feature impression axis determination method suitable for the feature impression axis determination system. That is, the method comprises: inputting a plurality of images by image input device; determining a standard impression value of each of the plurality of images input through the image input device with respect to at least two standard impression axes, using a standard impression value determination device (standard impression value determination means); and determining an axis on which a variance of the standard impression values determined by the standard impression value determination device becomes a maximum in a standard region defined by the at least two standard impression axes as a feature impression axis indicating features of the plurality of images input through the image input device, using the feature impression axis determination device.

The invention also provides a feature impression axis determination system that executes, using a processor, a process of inputting a plurality of images; a process of determining a standard impression value of each of the plurality of input images with respect to at least two standard impression axes; and a process of determining an axis on which a variance of the determined standard impression values becomes a maximum in a standard region defined by the at least two standard impression axes as a feature impression axis indicating features of the plurality of input images.

The invention also provides a computer-readable program that controls a computer of the feature impression axis determination system, and a recording medium on which the program is stored.

The feature impression axis determination system may further comprise: a first impression value display control device (first impression value display control means) for plotting the standard impression values determined by the standard impression value determination device in the standard region to be displayed in the standard region.

The feature impression axis determination system may further comprise: a feature impression axis display control device (feature impression axis display control means) for displaying the feature impression axis determined by the feature impression axis determination device in the standard region in which the standard impression values are plotted and displayed by the first impression value display control device.

The feature impression axis determination system may further comprise: a feature impression value calculation device (feature impression value calculation means) for calculating a feature impression value in the feature impression axis determined by the feature impression axis determination device, with respect to each of the plurality of images input through the image input device; a characteristic value determination device (characteristic value determination means) for determining a characteristic value that is a characteristic that serves as an index for analyzing or classifying an image, with respect to each of the plurality of images input through the image input device; and a second impression value display control device (second impression value display control means) for setting the feature impression axis determined by the feature impression axis determination device as a first axis, setting an axis of the characteristic that serves as the index as a second axis, and plotting the feature impression values calculated by the feature impression value calculation device according to the characteristic values determined by the characteristic value determination device in an image characteristic region defined by the first axis and the second axis to be displayed in the image characteristic region.

The index is an image quality or imaging date and time, for example.

The feature impression axis determination system may further comprise: a first image group extraction device (first image group extraction means) for extracting an image group corresponding to an aggregate of plots for which a distance between plots of feature impression values is equal to or smaller than a threshold value in the image characteristic region from the plurality of images input through the image input device.

The feature impression axis determination system may further comprise: an image synthesis device (image synthesis means) for synthesizing an image included in the image group extracted by the first image group extraction device with a mount image corresponding to an impression, on the feature impression axis, of the image group extracted by the first image group extraction device.

The feature impression axis determination system may further comprise: a second image group extraction device (second image group extraction means) for extracting an image group having an image quality that is equal to or greater than a threshold value among the plurality of images input through the image input device. In this case, the standard impression value determination device determines a standard impression value of each image included in the image group extracted from the second image group extraction device with respect to the at least two standard impression axes, and the feature impression axis determination device determines the axis on which the variance of the standard impression values determined by the standard impression value determination device becomes a maximum in the standard region defined by the at least two standard impression axes as a feature impression axis indicating features of the image group extracted from the second image group extraction device.

According to the invention, a plurality of images is input, and a standard impression value of each of the plurality of input images is determined with respect to at least two standard impression axes. In a standard region defined by the two standard impression axes, an axis on which a variance of the standard impression values becomes a maximum is determined as a feature impression axis indicating features of the plurality of input images. In this way, it is possible to determine a feature impression axis indicating features of a plurality of images.

DESCRIPTION OF THE PREFERRED EMBODIMENTS

First Embodiment

Figure 1:
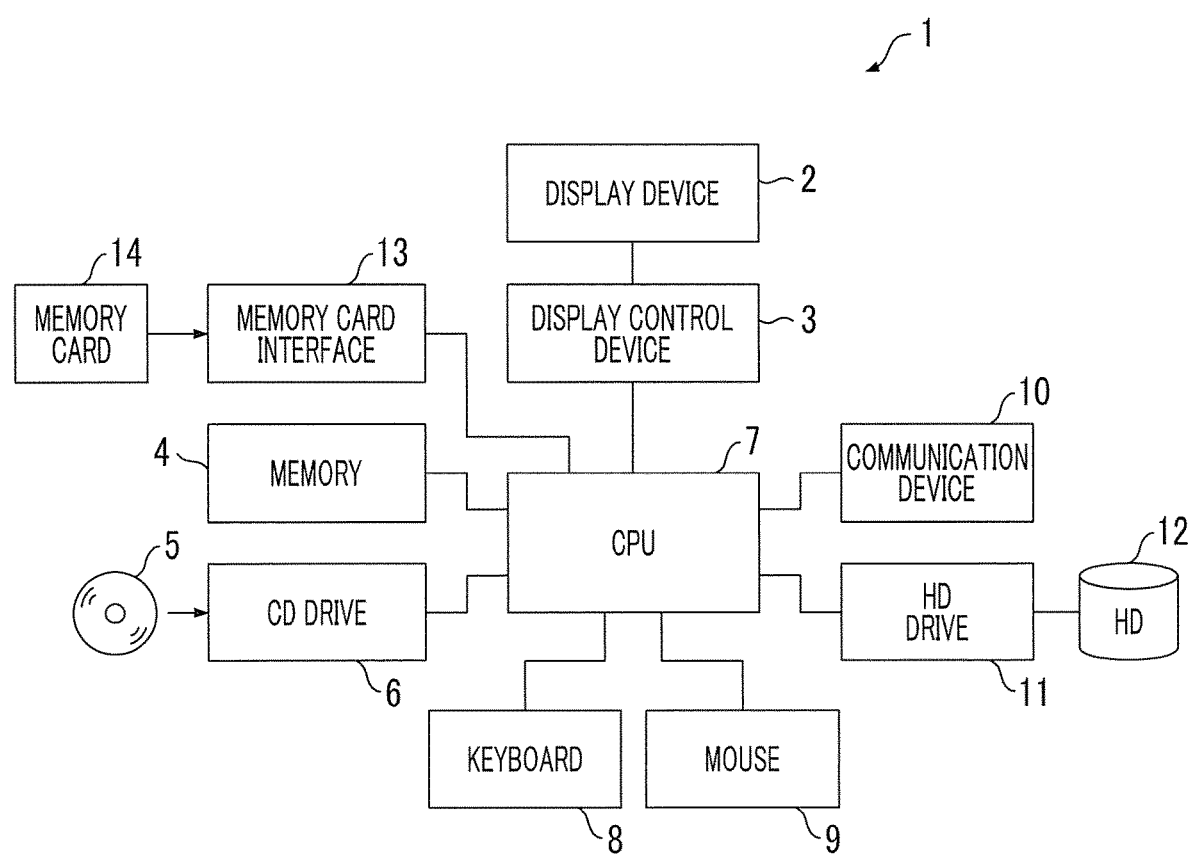
FIG. 1 is a block diagram showing an electric configuration of an image synthesis apparatus.

FIG. 1 is a block diagram showing an embodiment of the invention, and shows an electric configuration of an image synthesis apparatus 1 (feature impression axis determination system).

Overall operations of the image synthesis apparatus 1 are controlled by a central processing unit (CPU) 7.

The image synthesis apparatus 1 includes a display device 2 controlled by a display control device 3, a memory 4 that temporarily stores data, a compact disc (CD) drive 6 for having access to a compact disc 5, and a keyboard 8 and a mouse 9 for causing a user to give a command to the image synthesis apparatus 1. Further, the image synthesis apparatus 1 also includes a hard disk (HD) drive 11 for having access to a hard disk (HD) 12, and a communication device 10 for communicating with a server (not shown) or the like. In addition, the image synthesis apparatus 1 also includes a memory card interface 13 that reads an image filter or the like stored in a memory card 14.

The compact disc 5 in which a program that controls operations (which will be described later) is stored is loaded into the image synthesis apparatus 1, and the program stored in the compact disc 5 is read by the CD drive 6. As the read program is installed in the image synthesis apparatus 1, the image synthesis apparatus 1 performs the operations (which will be described later). The program that controls the image synthesis apparatus 1 is not only read from a recording medium such as the compact disc 5, but may also be received as a program that is transmitted through the Internet.

Figure 2:
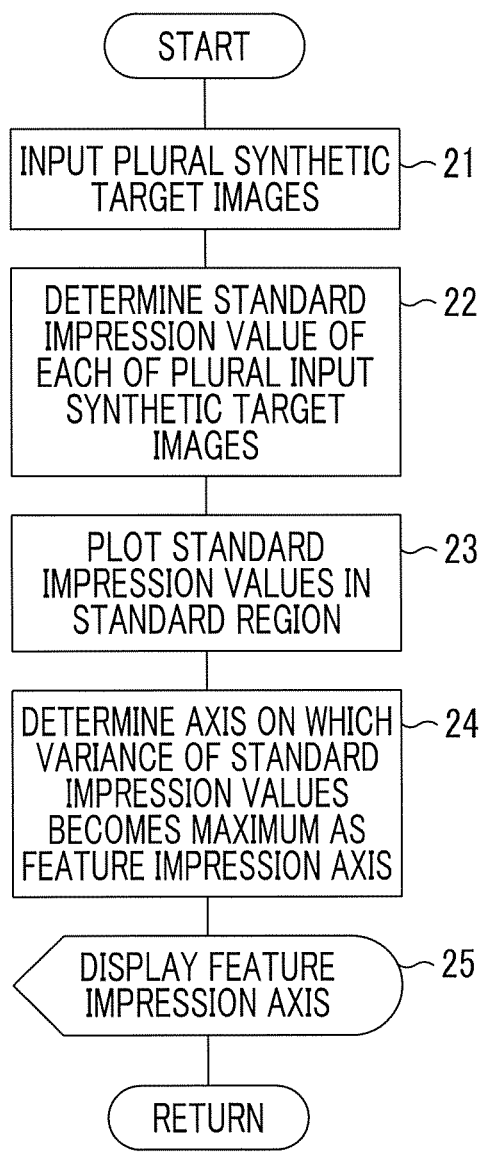
FIG. 2 is a flowchart showing a processing procedure of an image synthesis apparatus.

FIG. 2 is a flowchart showing a processing procedure of the image synthesis apparatus 1.

In this embodiment, a synthesis candidate image is synthesized with a template image to generate a synthetic image. A user loads the memory card 14 in which (a file indicating) a plurality of synthesis candidate images is stored into the image synthesis apparatus 1, and inputs the plurality of synthesis candidate images (images) to the image synthesis apparatus 1 through the memory card interface 13 (an image input device) (step 21). All images stored in the memory card 14 may be used as synthesis candidate images. In a case where a folder is formed in the memory card 14 and images are stored in the folder, the folder may be designated, and all images stored in the designated folder may be used as synthesis candidate images to be input to the image synthesis apparatus 1. The synthesis candidate images are not limited to images stored in the memory card 14, and images stored in the compact disc 5 and images stored in the hard disk 12 may be designated and the designated images may be used as the synthesis candidate images.

In a case where the plurality of synthesis candidate images is input to (designated in) the image synthesis apparatus 1, standard impression values of each of the plurality of input synthesis candidate images are determined by the CPU 7 (a standard impression value determination device) (step 22). The standard impression values represent impression values in two arbitrary impression axes (standard impression axes). The two arbitrary impression axes may be two impression axes that are determined in advance, may be two impression axes that are designated by the user, or may be two impression axes that are determined by the image synthesis apparatus 1, for example.

Figure 3:
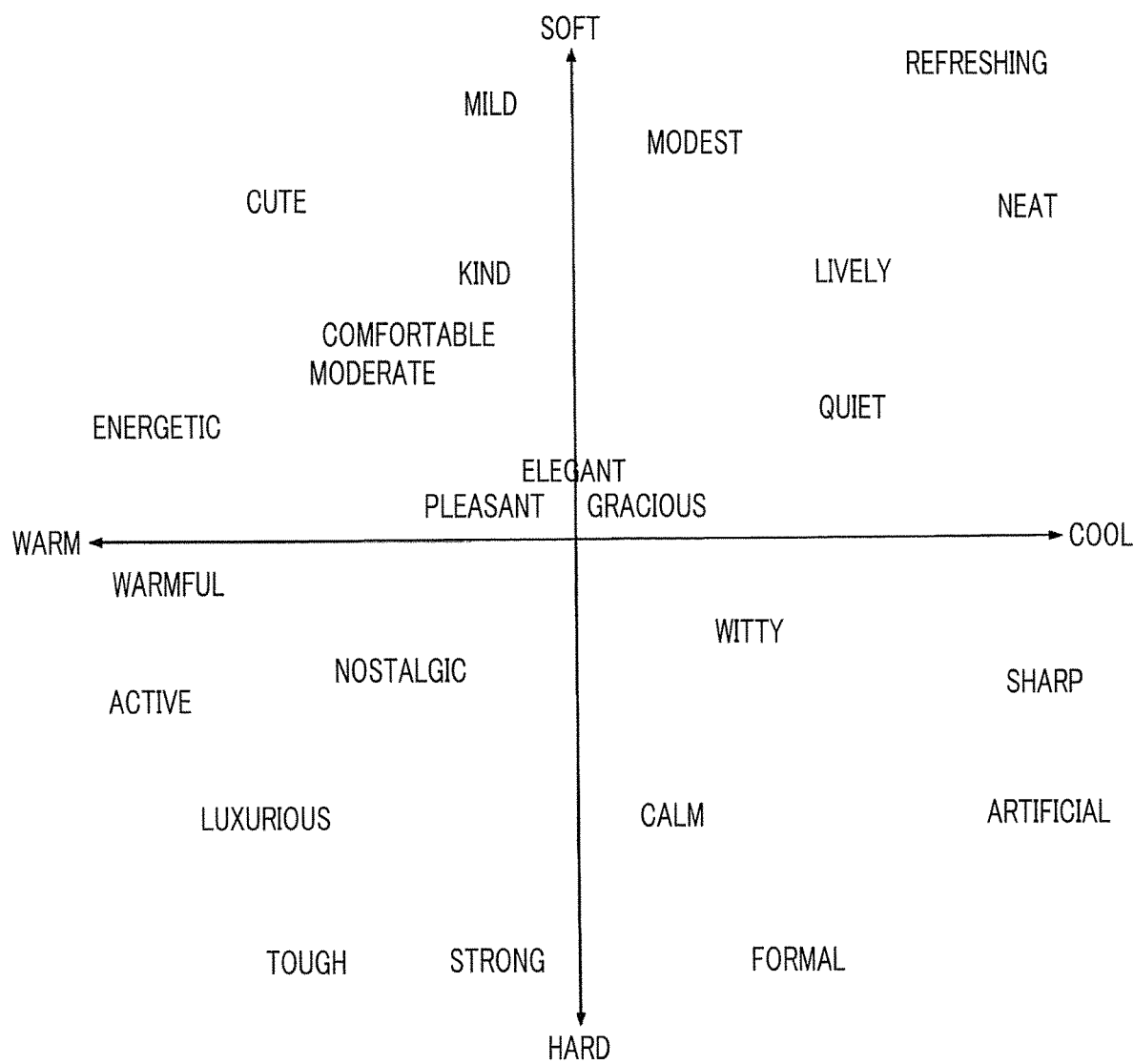
FIG. 3 is an example of a standard region in which sensitivity words are displayed.

FIG. 3 is a diagram showing an example of a standard region defined by two standard impression axes that are determined in advance.

A lateral axis among standard impression axes in the standard region is defined by respective sensitivity words of "warm" and "cool", and a longitudinal axis among the standard impression axes in the standard region is defined by respective sensitivity words of "soft" and "hard".

Figure 5:
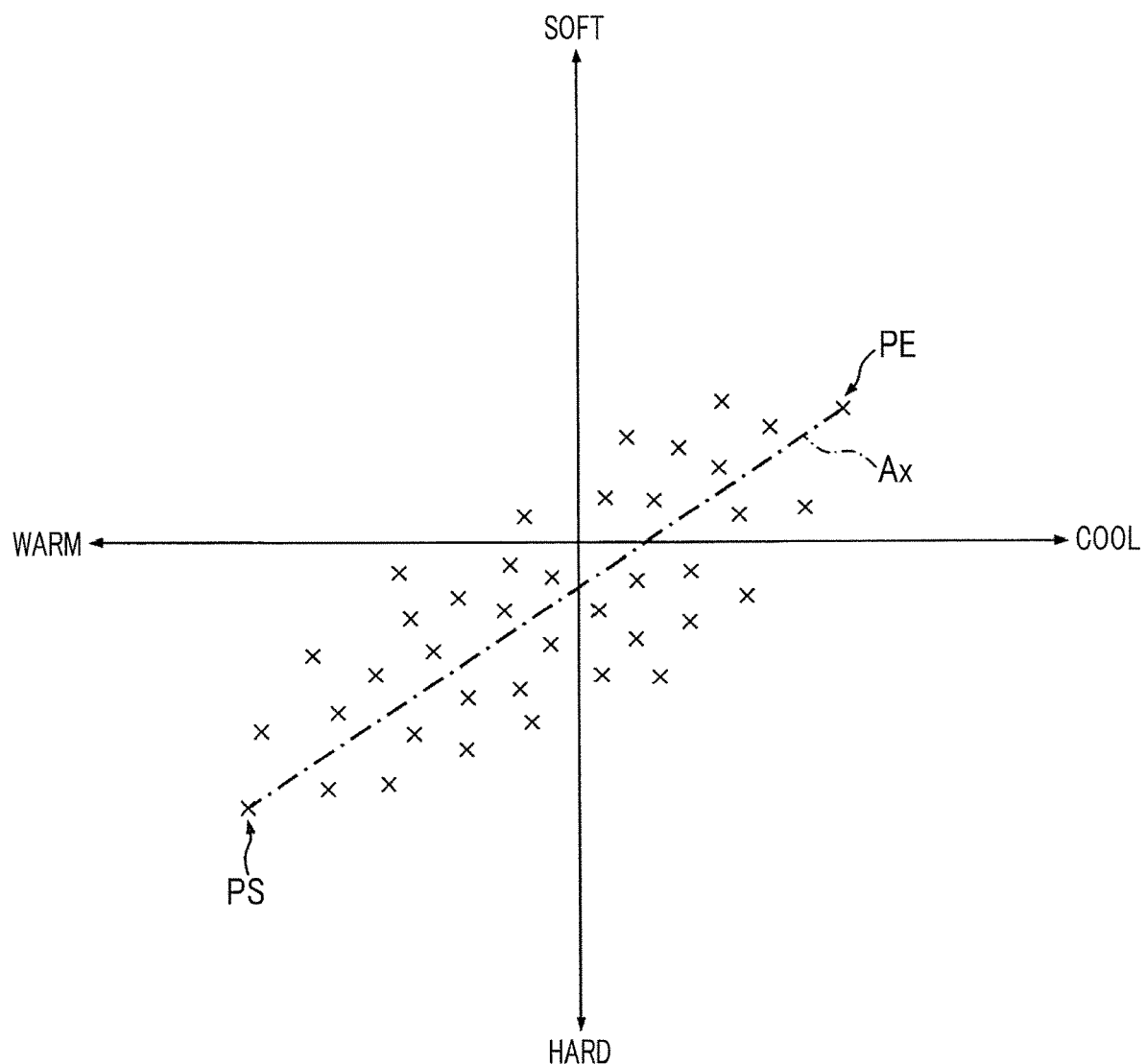
FIG. 5 is a diagram showing an example of a standard region in which standard impression axes are displayed.

In the standard region shown in FIG. 5, sensitivity words indicating impressions such as "mild", "cute" or the like corresponding to impression values defined by the standard impression axes are distributed. However, it is not essential that sensitivity words are distributed in the standard region.

In a case where a standard impression value corresponding to "warm" and "cool" and a standard impression value corresponding to "soft" and "hard" are stored in a header of an image file of each of the plurality of synthesis candidate images, the standard impression values are read from the header of the image file by the CPU 7 (a standard impression value determination device), and thus, the standard impression values of each synthesis candidate image are determined. In a case where the standard impression value corresponding to "warm" and "cool" and the standard impression value corresponding to "soft" and "hard" are not stored in the header of the image file, for example, a representative color is determined from a color distribution of each of the synthesis candidate images, the standard impression value corresponding to "warm" and "cool" and the standard impression value corresponding to "soft" and "hard" are determined with respect to the determined representative color. The standard impression value corresponding to "warm" and "cool" and the standard impression value corresponding to "soft" and "hard" are determined for each color in advance. The representative color may be determined as the most frequent color among the synthesis candidate images, an average color of a main subject among the synthesis candidate images, or the like. Further, a plurality of representative colors such as a first representative color and a second representative color may be determined, and the standard impression values may be calculated by a combination of the representative colors.

In a case where the standard impression values are determined, the standard impression values are plotted in the standard region by the CPU 7 (step 23). The standard impression values plotted in the standard region are displayed on a display screen of a display device by the display control device 3 (a first impression value display control device). All standard impression values relating to the plurality of synthesis candidate images input to the image synthesis apparatus 1 are plotted in the standard region, but standard impression values relating to for arbitrary synthesis candidate images among the plurality of input synthesis candidate images may be plotted in the standard region.

Figure 4:
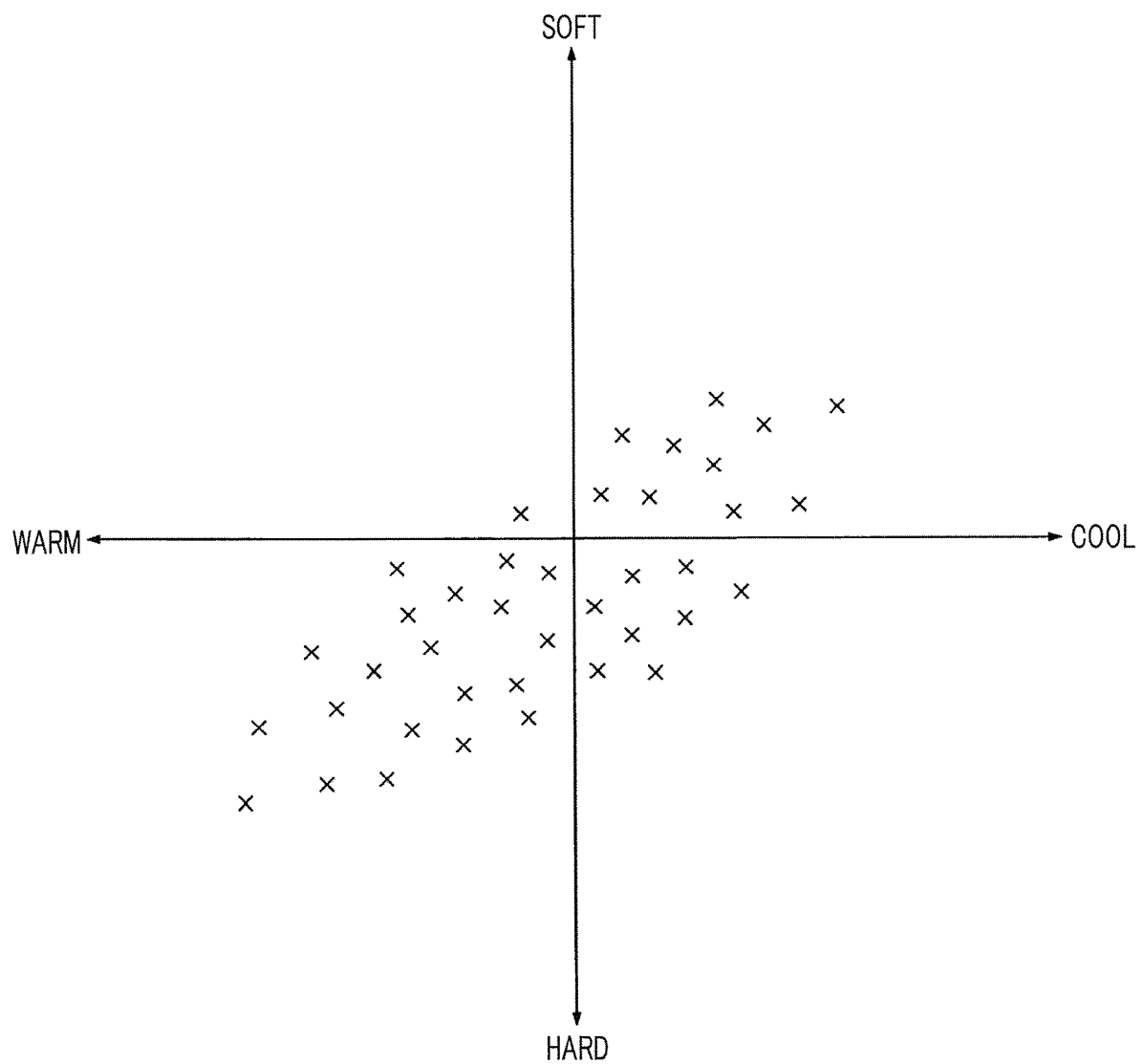
FIG. 4 is a diagram showing an example of a standard region in which standard impression values are distributed.

FIG. 4 is a diagram showing an example of a standard region in which standard impression values are plotted.

In FIG. 4, one X mark corresponds to standard impression values of one synthesis candidate image.

In a case where the standard impression values relating to the plurality of synthesis candidate images input to the image synthesis apparatus 1 are plotted in the standard region, an axis on which a variance of the standard impression values becomes a maximum in the standard region defined by at least two standard impression axes is determined by the CPU 7 (a feature impression axis determination device) as a feature impression axis indicating features of the plurality of synthesis candidate images (the plurality of synthetic images input to the image synthesis apparatus 1) of which standard impression values are distributed in the standard region (step 24). The determined standard impression axes are displayed on a display screen (standard region) of the display device 2 by the display control device 3 (a feature impression axis display control device) (step 25). As the feature impression axes are determined, in the feature impression axes, for example, it is possible to confirm what kind of impression an image input by the user has, and what kind of impression widths a plurality of images input by the user has. Thus, the user may select only an image having an impression preferred by the user to easily create a postcard, a photo book, or the like. For example, in a case where the user selects a plurality of images having the same impression to create one postcard, the postcard has a unified impression. In a case where the user selects a plurality of images having the same impression and disposes the images on each page of a photo book, it is possible to create a highly advantageous photo book that has a sense of unity on each page and has different impressions over the respective pages as a whole.

FIG. 5 is a diagram showing an example of a standard region in which standard impression axes are displayed.

As described above, an axis Ax on which the variance of the plurality of standard impression values that is plotted in the standard region becomes a maximum is detected, and the axis Ax is determined as a feature impression axis Ax.

As shown in FIG. 5, the determination of the impression axis on which the variance of the standard impression values distributed in the standard region becomes a maximum corresponds to calculation of a regression line on the basis of the distribution of the standard impression values. A method for calculating the regression line is known, but specific processes of the method are as follows. First, a standard deviation $\sigma x$ in a lateral axis direction and a standard deviation $\sigma y$ in a longitudinal axis direction indicated by standard impression values of a plurality of synthesis candidate images are calculated with respect to respective impression axes of a lateral axis and a longitudinal axis in a standard region, and a covariance of the respective synthesis candidate images in the respective axes of the lateral axis and the longitudinal axis is calculated. By dividing the calculated covariance by a product obtained by multiplication of standard deviations of respective impressions in the lateral axis and the longitudinal axis, a correlation coefficient r of the plurality of synthesis candidate images is calculated. The regression line is represented as shown in Formula (1).

$$(x-x0)/a=(y-y0)/b \quad (1)$$

Here, x0 represents an average value of standard impression values of respective images in the lateral axis, and y0 represents an average value of the standard impression values of the respective images in the longitudinal axis. Here, "a" and "b" are unfixed coefficients.

Further, since Formula (2) is established, it is possible to calculate "a" and "b" from Formula (1) and Formula (2), and thus, it is possible to specifically calculate the feature impression axis Ax in FIG. 5.

$$\sigma x/a = r \cdot (\sigma y/b) \quad (2)$$

One end point PS and the other end point PE in the feature impression axis Ax shown in FIG. 5 may be set as a starting point and an ending point in a distribution of standard impression values in the direction of the feature impression axis Ax among distributions of the standard impression values. For example, in a case where a sensitivity word at the position of an impression region shown in FIG. 3 corresponding to the position of one end point PS in the feature impression axis Ax is "luxurious" and a sensitivity word at the position of a target region shown in FIG. 5 corresponding to the position of the other end point PE in the feature impression axis Ax is "quiet", the feature impression axis Ax becomes an impression axis that connects a "luxurious" impression and a "quiet" impression.

In the above-described embodiment, the plurality of impression axes that corresponds to the lateral axis of "warm" and "cool" and the longitudinal axis of "soft" and "hard" are determined in advance, but may be arbitrarily determined by a user or the like, instead of being determined in advance. In a case where they are arbitrarily determined, it is possible to determine standard impression axes in a similar way. Further, in the above-described embodiment, the impression region is a two-dimensional region defined by two impression axes that includes a longitudinal axis and a lateral axis, but the impression region may be a region of three or more dimensions defined by three or more impression axes, and in this case, it is possible to determine standard impression axes in a similar way.

Since the feature impression axis indicating features of a plurality of synthesis candidate images can be determined, for example, it is possible to synthesize the synthesis candidate images with template images or the like suitable for impressions in the feature impression axes. Further, it is possible to synthesize images included in various template images having impressions in an impression range defined by the feature impression axis.

Second Embodiment

Figure 6:
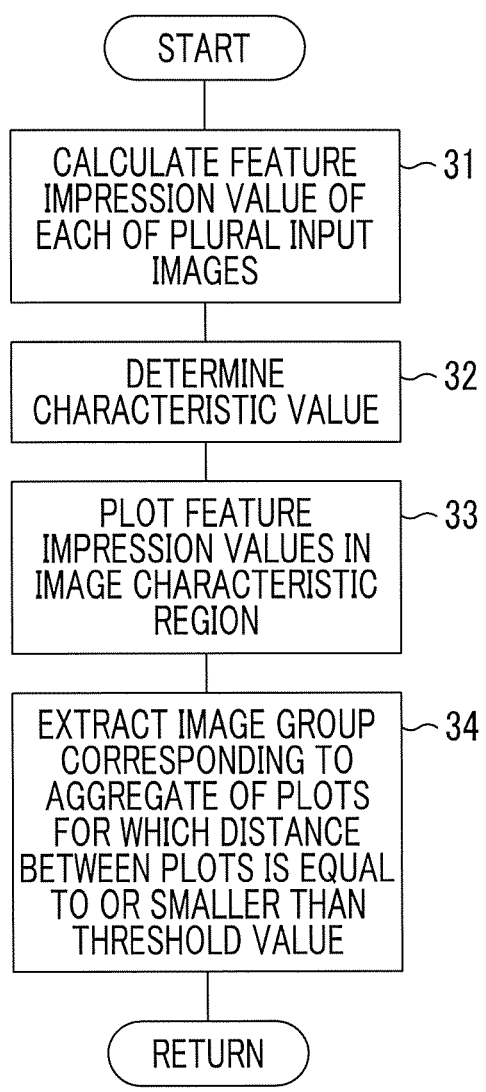
FIG. 6 is a flowchart showing a processing procedure of an image synthesis apparatus.

FIG. 6 is a flowchart illustrating a processing procedure of the image synthesis apparatus 1.

In a case where a feature impression axis Ax is determined, a feature impression value in the feature impression axis Ax is calculated by the CPU 7 (a feature impression value calculation device) with respect to each of a plurality of synthesis candidate images input to the image synthesis apparatus 1 (step 31).

Figure 7:
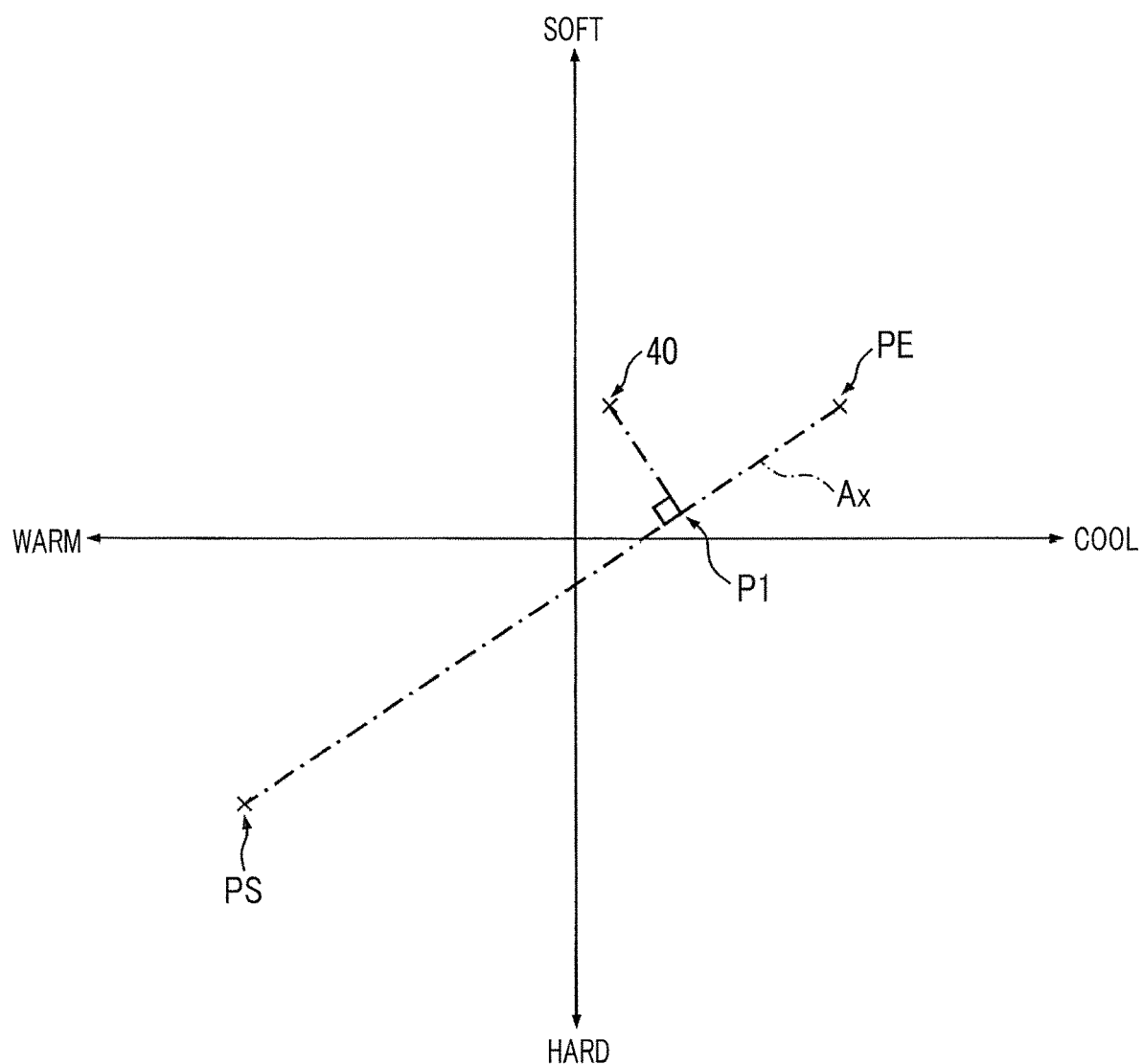
FIG. 7 is a diagram showing an example of a standard region in which standard impression axes are displayed.

FIG. 7 is a diagram corresponding to FIG. 5, which shows an example of a standard region in which the feature impression axis Ax is displayed.

With respect to a synthesis candidate image having a standard impression value indicated by a reference numeral 40, among the plurality of standard impression values indicated by the plurality of X marks shown in FIG. 5, a feature impression value in the feature impression axis Ax is obtained as follows. When a perpendicular line is drawn from the position of an X mark of the reference numeral 40 to the feature impression axis Ax, the position of an intersection P1 between the perpendicular line and the feature impression axis Ax represents the feature impression value in the feature impression axis Ax. For example, in a case where the end point PS represents the "luxurious" impression and the end point PE represents the "quiet" impression, and in a case where a feature impression value of the end point PS is represented as L0, a feature impression value of the end point PE is represented as L10, and the feature impression axis Ax is divided into 10, if the intersection P1 is at a position close to the end point PE by which the feature impression axis Ax is divided at a ratio of 7:3, the standard impression value in the feature impression axis Ax of the synthesis candidate image having the standard impression value of the X mark of the standard numeral 40 becomes L7. The invention is not limited to the synthesis candidate image having the standard impression value of the X mark indicated by the standard numeral 40, and standard impression values of other synthesis candidate images may be calculated by the CPU 7 in a similar way.

After the feature impression value is calculated with respect to each of the plurality of synthesis candidate images input to the image synthesis apparatus 1, a characteristic value that represents a characteristic that serves as an index for analyzing or classifying an image is determined by the CPU 7 (a characteristic value determination device), with respect to each of the plurality of synthesis candidate images input to the image synthesis apparatus 1 (step 32). This index is an image quality or an imaging date (imaging date and time) of a synthesis candidate image, for example. The image quality is defined without depending on subjectivity, and refers to attributes of an image. For example, the image quality may be set to become better as the image becomes larger, or as the image becomes smaller. For example, the attributes include the degree of image blurring, the degree of camera shake, contrast, the number of pixels, resolution, brightness, or the like, but are not limited thereto.

Subsequently, using the determined feature impression axis Ax as a first axis and using the characteristic that serves as the index as a second axis, an image characteristic region is defined by the CPU 7. In the defined image characteristic region, the calculated feature impression values are plotted by the CPU 7 according to the determined characteristic values (step 33). The image characteristic region in which the feature impression values are plotted is displayed on the display screen of the display device 2 by the display control device 3 (a second impression value display control device).

Figure 8:
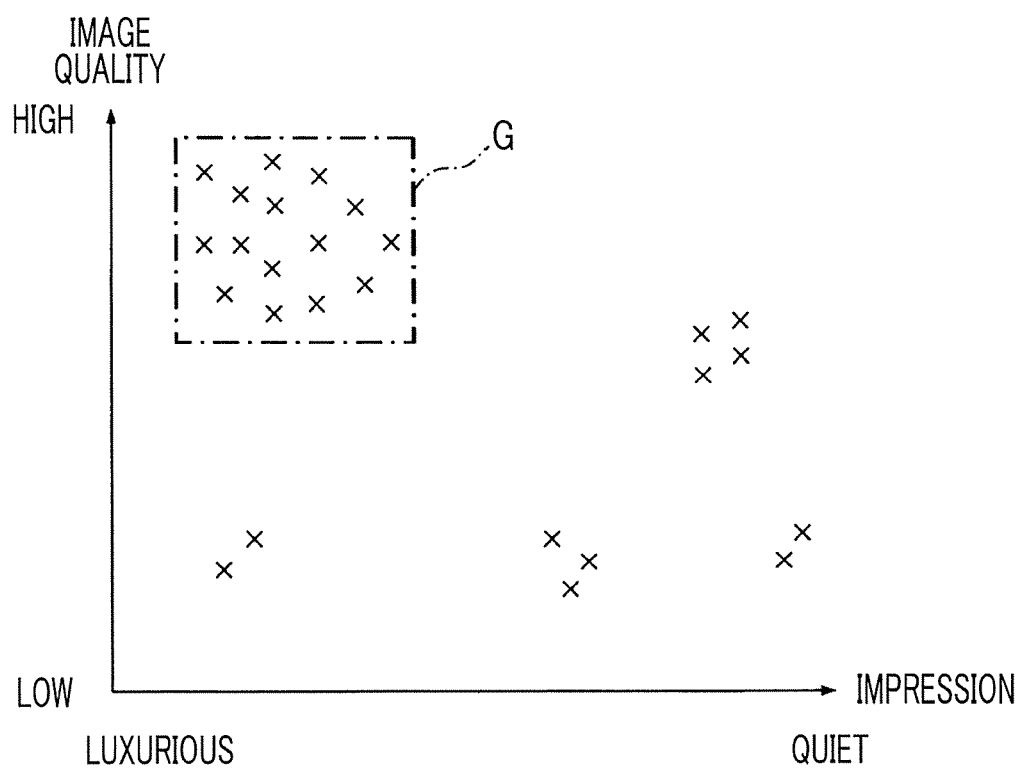
FIG. 8 is a diagram showing an example of an image characteristic region.

FIG. 8 is a diagram showing an example of an image characteristic region in which feature impression values are plotted.

A lateral axis represents the feature impression axis Ax, and a longitudinal axis represents an image quality. X marks represent feature impression values.

As shown in FIG. 8, in a case where feature impression values of a plurality of synthesis candidate images are plotted in the image characteristic region, an image group corresponding to a feature impression value group G that is an aggregate of plots for which a distance between plots of feature impression values is equal to or smaller than a threshold value is extracted from the plurality of images input to the image synthesis apparatus 1 by the CPU 7 (step 34). Preferably, an image group in which plots of a number that is equal to or greater than a threshold value are included is extracted by the CPU 7.

Referring to FIG. 8, in a case where the feature impression value group G is an aggregate of plots for which a distance between plots of feature impression values included in the feature impression value group G is equal to or smaller than the threshold value, an image group formed by a plurality of synthesis candidate images having a plurality of feature impression values included in the feature impression value group G is extracted by the CPU 7 (a first image group extraction device). The plurality of synthesis candidate images that forms the image group corresponding to the aggregate of plots for which the distance between plots of feature impression values is equal to or smaller than the threshold value have the same impression, and have the same characteristic (the same image quality in the case of FIG. 8). In a case where one photo book, one post card, or the like is generated using the plurality of images that forms the image group extracted in this way, it is possible to generate a photo book, a post card, or the like with an integrated impression.

For example, in a case where the image group corresponding to the feature impression value group G is extracted, a mount image corresponding to standard impression values of the image group is read from the HD 12 of the image synthesis apparatus 1 by the CPU 7. Since the standard impression values included in the image group correspond to a "relatively luxurious" impression, a "relatively luxurious" mount image is read from the HD 12. The images included in the image group are synthesized with the read mount image to generate a synthetic image by the CPU 7 (an image synthesis device).

Figure 9:
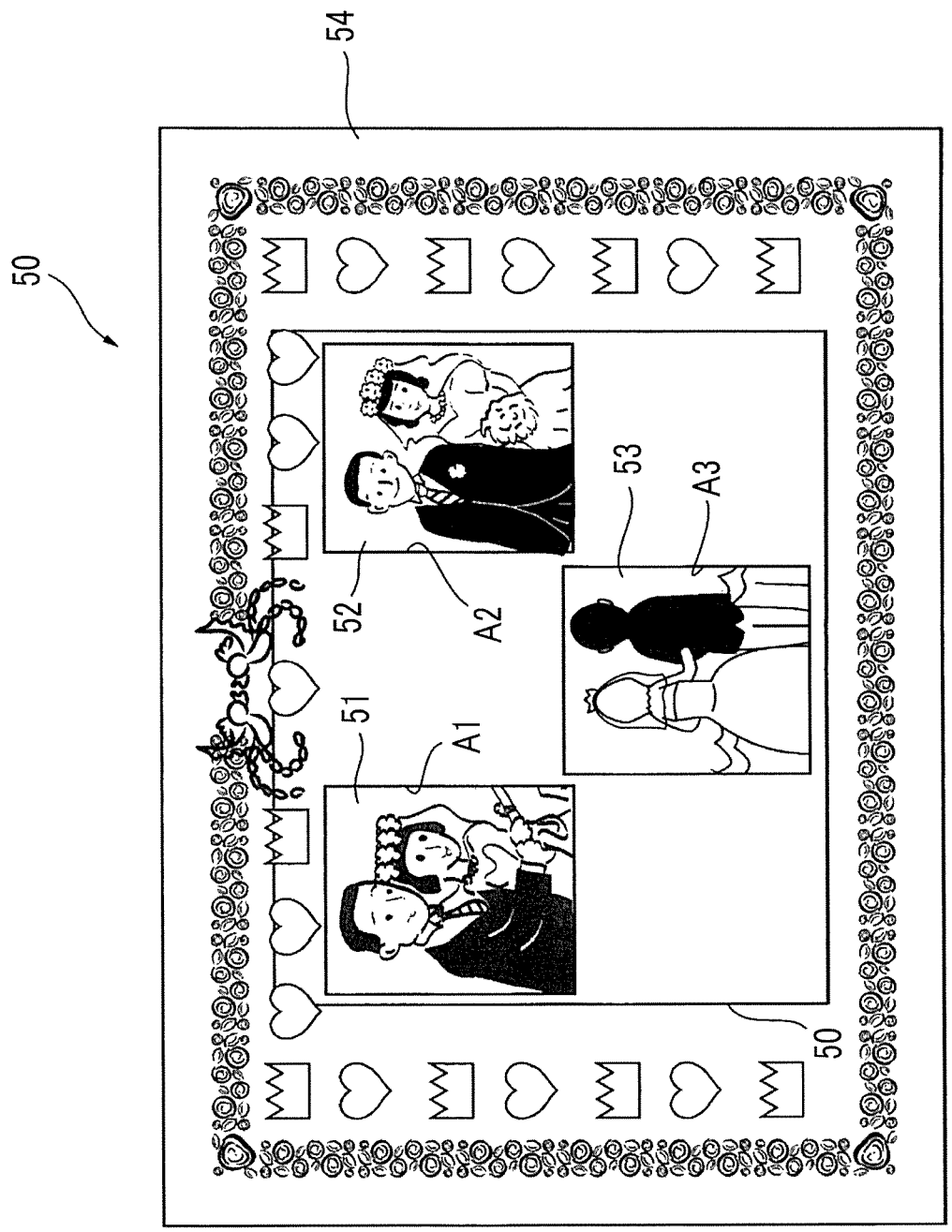
FIG. 9 is a diagram showing an example of a synthetic image.

FIG. 9 is a diagram showing an example of a generated synthetic image 50.

A read mount image 54 is a "relatively luxurious" mount image, in which three synthetic regions A1, A2, and A3 are defined. Three images 51, 52, and 53 included in an extracted image group are synthesized with the synthetic regions A1, A2, and A3 to generate the synthetic image 50. The number of mount images read from the HD 12 may be one, or may be plural. Further, the number of regions where synthesis candidate images are pasted may be arbitrary. One synthesis candidate image may be synthesized with one mount image.

Figure 10:
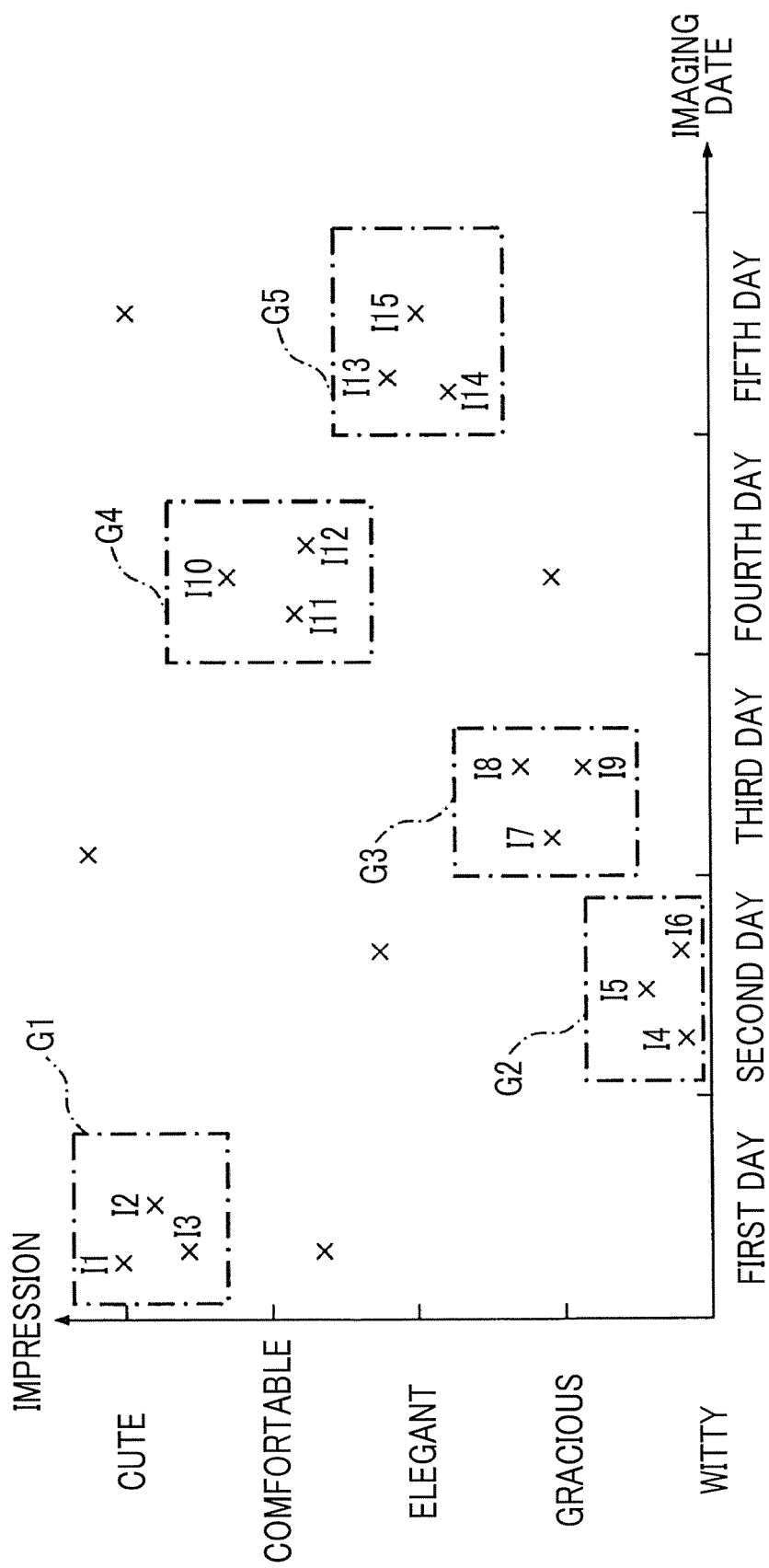
FIG. 10 is a diagram showing an example of an image characteristic region.

FIG. 10 is a diagram showing an example of an image characteristic region.

FIG. 10 is a diagram corresponding to FIG. 8, which shows that a longitudinal axis (a first axis) represents a feature impression axis and a lateral axis (a second axis) represents an imaging date (imaging date and time). In the example shown in FIG. 10, it is assumed that a feature impression axis defined by sensitivity words "cute" and "stylish" is determined. In the feature impression axis, sensitivity words indicated by "comfortable", "elegant" or "gracious" are included between "cute" and "stylish". In FIG. 10, feature impression values corresponding to images captured at imaging dates of the first day to the fifth day are plotted with X marks.

In the image characteristic region shown in FIG. 10, it is assumed that each of feature impression value groups G1 to G5 is an aggregate of plots for which a distance between plots of feature impression values is equal to or smaller than a threshold value. The feature impression value group G1 includes feature impression values corresponding to synthesis candidate images I1 to I3. Similarly, the feature impression value groups G2, G3, G4, and G5 include feature impression values corresponding to images I4 to I6, images I7 to I9, images I10 to I12, and images I13 to I15, respectively. The synthesis candidate images I1 to I3 corresponding to the feature impression values included in the feature impression value group G1 are captured on the first day during travel, for example. Similarly, the synthesis candidate images I4 to I6 corresponding to the feature impression values included in the feature impression value group G2, the synthesis candidate images I7 to I9 corresponding to the feature impression values included in the feature impression value group G3, the synthesis candidate images I10 to I12 corresponding to the feature impression values included in the feature impression value group G4, the synthesis candidate images I13 to I15 corresponding to the feature impression values included in the feature impression value group G5 are captured on the second day, the third day, the fourth day, and the fifth day during travel, respectively.

Since most of the feature impression values included in the feature impression value group G1 have a "cute" impression, a mount image of the "cute" impression is selected with respect to the synthesis candidate images I1 to I3 corresponding to the feature impression values. The synthesis candidate images I1 to I3 are synthesized with the selected mount image. Similarly, since most of the feature impression values included in the feature impression value group G2 have a "luxurious" impression, a mount image of the "luxurious" impression is selected with respect to the synthesis candidate images I4 to I6 corresponding to the feature impression values. Since most of the feature impression values included in the feature impression value group G3 have a "gracious" impression, a mount image of the "gracious" impression is selected with respect to the synthesis candidate images I7 to I9 corresponding to the feature impression values. Since most of the feature impression values included in the feature impression value group G4 have a "comfortable" impression, a mount image of the "comfortable" impression is selected with respect to the synthesis candidate images I10 to I12 corresponding to the feature impression values. Since most of the feature impression values included in the feature impression value group G5 have an "elegant" impression, a mount image of the "elegant" impression is selected with respect to the synthesis candidate images I13 to I15 corresponding to the feature impression values. In a header of a file indicating a mount image, data or the like indicating an impressions of each mount image is stored, and a corresponding mount image is selected from the impression.

FIGS. 11 to 15 are diagrams showing examples of synthetic images generated using the synthesis candidate images I1 to I15.

Figure 11:
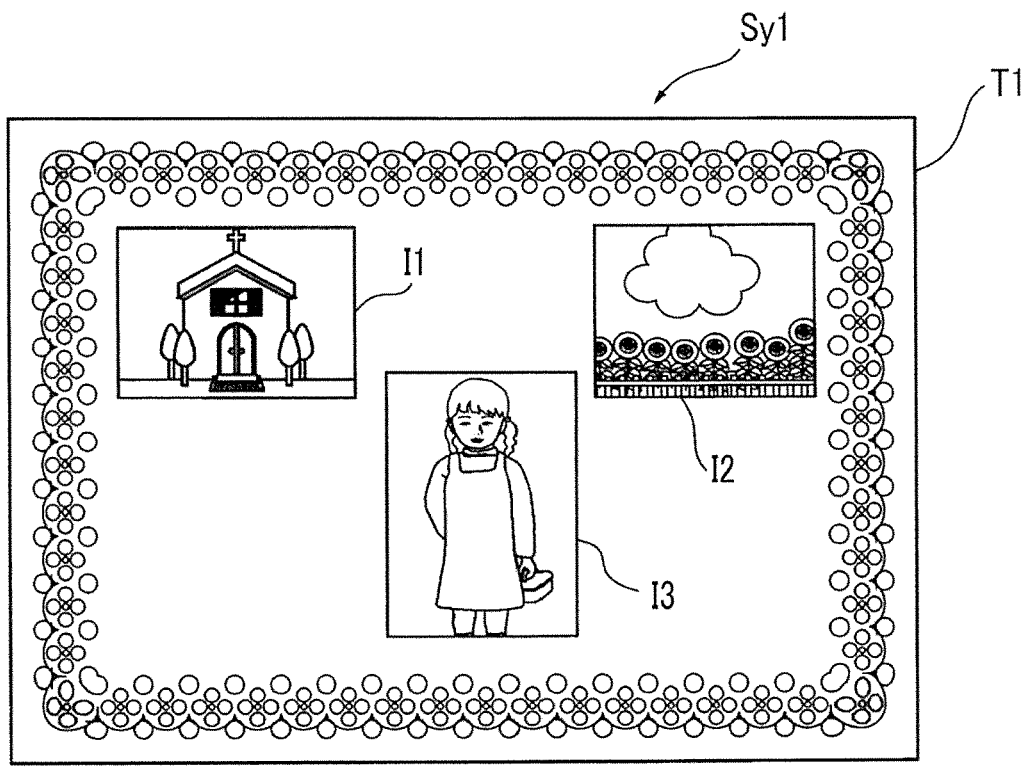
FIG. 11 is a diagram showing an example of a synthetic image.
Figure 12:
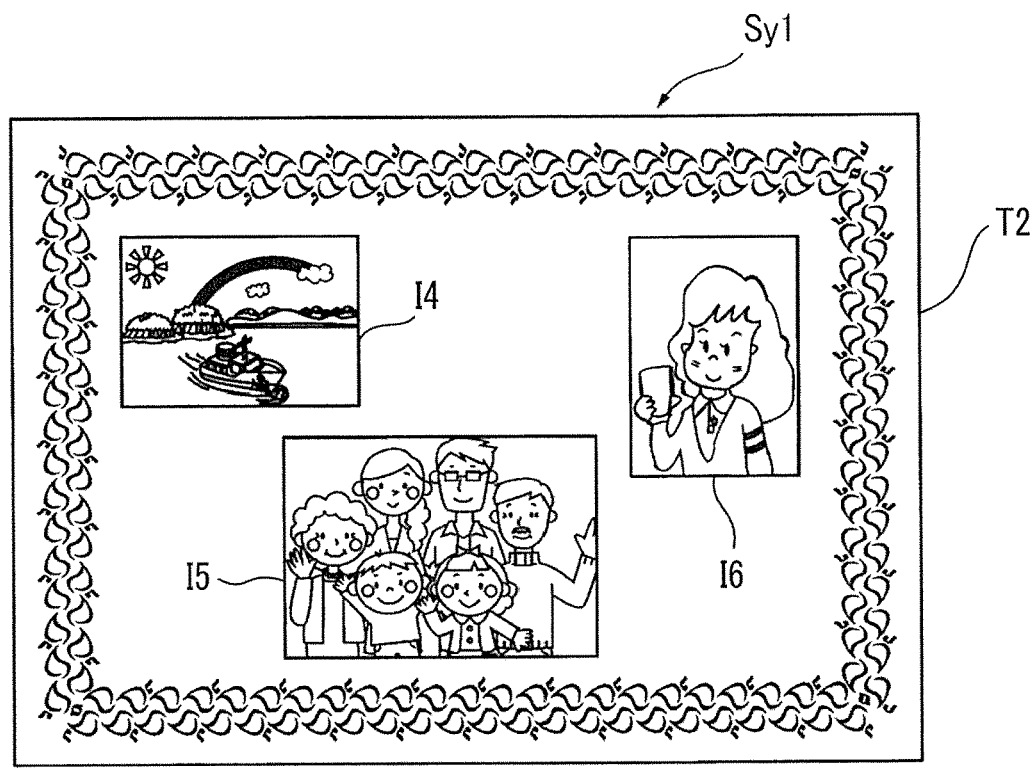
FIG. 12 is a diagram showing an example of a synthetic image.
Figure 13:
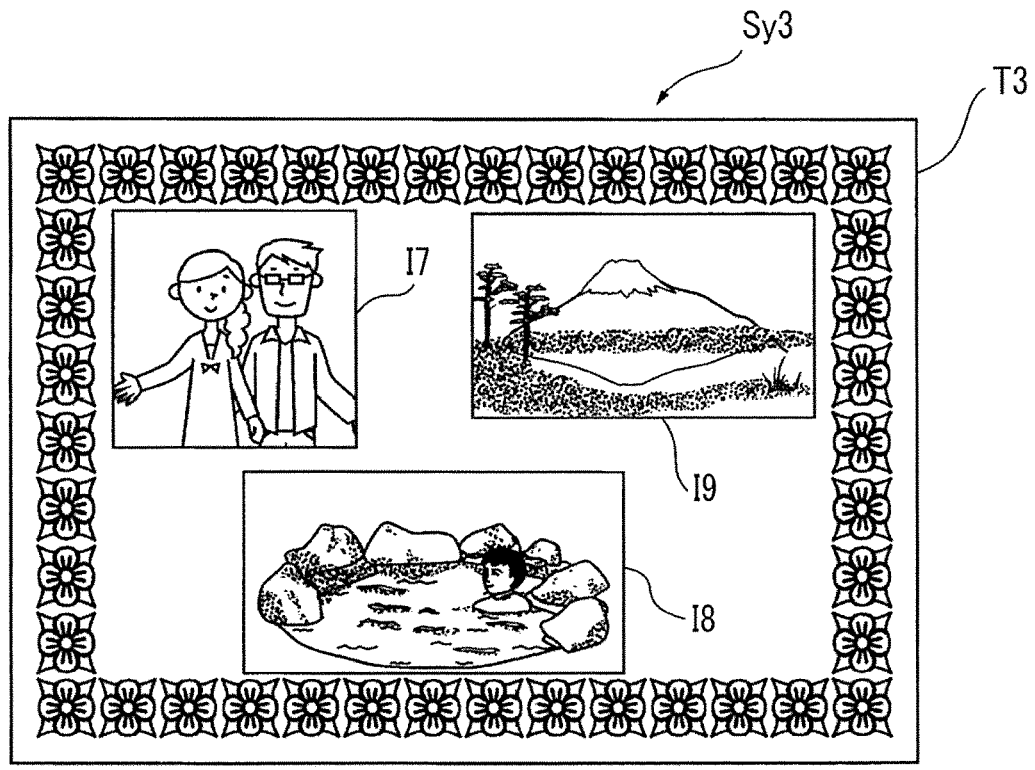
FIG. 13 is a diagram showing an example of a synthetic image.
Figure 14:
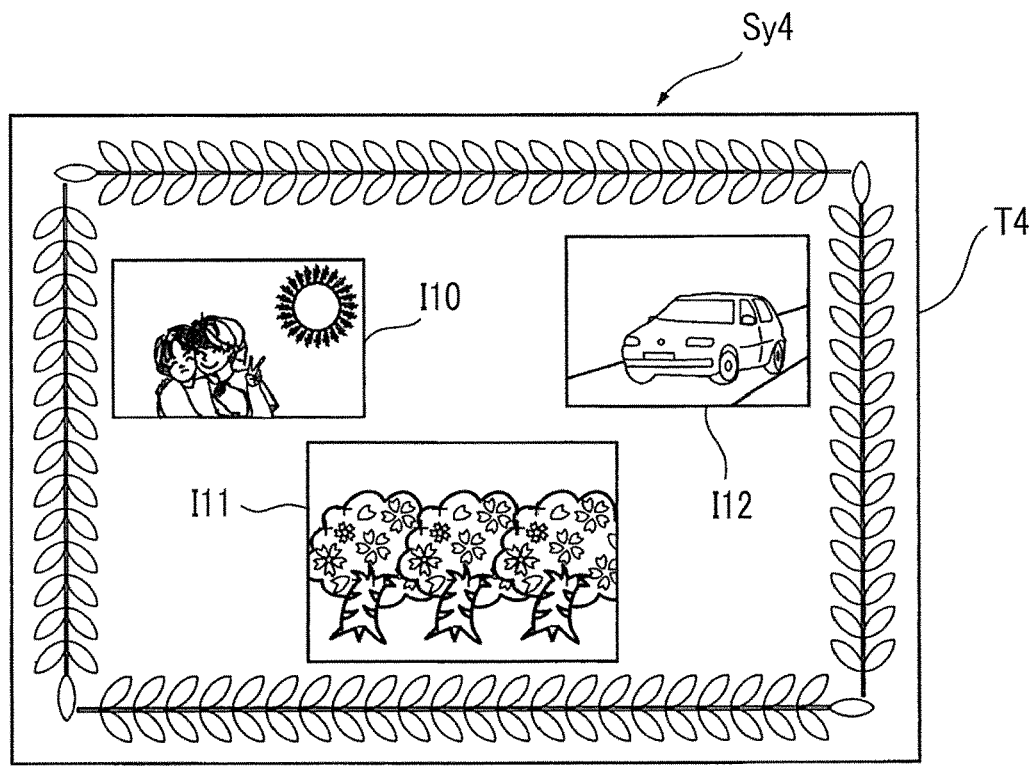
FIG. 14 is a diagram showing an example of a synthetic image.
Figure 15:
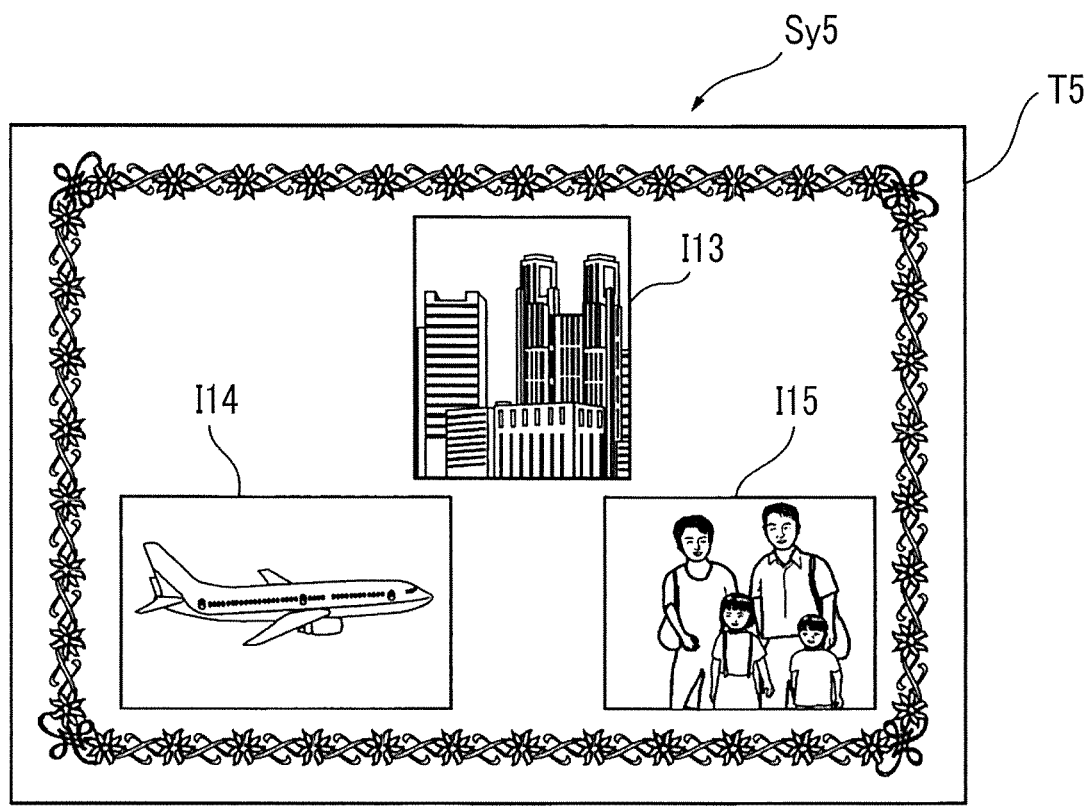
FIG. 15 is a diagram showing an example of a synthetic image.

A synthetic image Sy1 shown in FIG. 11 is obtained by synthesizing the synthesis candidate image I1 to I3 with a mount image T1. Since both of an impression of the mount image T1 and impressions of the synthesis candidate images I1 to I3 are "cute", the synthetic image Sy1 also shows a "cute" impression. Similarly, a synthetic image Sy2 shown in FIG. 12 is obtained by synthesizing the synthesis candidate image I4 to I5 with a mount image T2. Since both of an impression of the mount image T2 and impressions of the synthesis candidate images I4 to I6 are "stylish", the synthetic image Sy2 also shows a "stylish" impression. A synthetic image Sy3 shown in FIG. 13 is obtained by synthesizing the synthesis candidate image I7 to I9 with a mount image T3. Since both of an impression of the mount image T3 and impressions of the synthesis candidate images I7 to I9 are "gracious", the synthetic image Sy3 also shows a "gracious" impression. A synthetic image Sy4 shown in FIG. 14 is obtained by synthesizing the synthesis candidate image I10 to I12 with a mount image T4. Since both of an impression of the mount image T4 and impressions of the synthesis candidate images I10 to I12 are "comfortable", the synthetic image Sy4 also shows a "comfortable" impression. A synthetic image Sy5 shown in FIG. 15 is obtained by synthesizing the synthesis candidate image I13 to I15 with a mount image T5. Since both of an impression of the mount image T5 and impressions of the synthesis candidate images I13 to I15 are "elegant", the synthetic image Sy5 also shows an "elegant" impression.

Using five synthetic images Sy1 to Sy5 that are obtained in this way, it is possible to create a photo book. An impression of each page of the photo book has a sense of unity. Since the impressions of the respective pages are distributed over impressions on a standard impression axis defined by "cute" to "stylish" impressions, it is possible to create a diversified photo book.

Further, in the above-described embodiment, an image group having an image quality that is equal to or greater than a threshold value among a plurality of images input to the image synthesis apparatus 1 may be extracted by the CPU 7 (a second image group extraction device). Then, a standard impression value of each image included in the image group extracted in this way is determined by the CPU 7. As shown in FIG. 5, a configuration in which an axis on which a variance of the standard impression values becomes a maximum is determined as a feature impression axis is the same as in the above description.

Since a feature impression axis is determined in advance with respect to an image group having a preferable image quality, it is possible to determine a feature impression axis different from a feature impression axis determined in a state where images having a poor image quality are included.

As the processing unit that executes the above-described processes, instead of the CPU 7 that executes software to function as a variety of processing units, for example, a dedicated electric circuit that is a processor having a circuit configuration that is dedicatedly designed for executing a specific process, such as a programmable logic device of which a circuit configuration is changeable after manufacturing such as a field-programmable gate array (FPGA), or an application specific integrated circuit (ASIC) may be used.

One processing unit may be configured of one processor among the variety of processors, or may be configured of a combination of two or more same or different types of processors (for example, a combination of a plurality of FPGAs, or a combination of a CPU and an FPGA). As an example in which a plurality of processing units is configured as one processor, first, there is a configuration in which one processor is configured of a combination of one or more CPUs and software and the processor functions as the plurality of processing units, as represented by a computer such as a client computer or a server. Secondly, as represented by a system-on-chip, or the like, there is a configuration in which a processor that realizes overall functions of a system that includes a plurality of processing units using one integrated circuit (IC) chip is used. In this way, various processing units may be configured by using one or more various processors as a hardware structure.

Further, more specifically, the hardware structure of the various processors is an electric circuit in which circuit elements such as semiconductor elements are combined.

In the above-described example, the image synthesis apparatus 1 is disclosed as a dedicated apparatus, but may be configured by a personal computer, may be configured by a so-called smart device such as a smartphone or a tablet device, or may be a mobile phone such as a feature phone, instead of the dedicated apparatus.

What is claimed is:

1. A feature impression axis determination system comprising:
   a processor configured to:
   receive a plurality of images;
   determine a standard impression value of each of the plurality of images with respect to at least two standard impression axes;
   determine an axis on which a variance of the standard impression values determined by the processor becomes a maximum in a standard region defined by the at least two standard impression axes as a feature impression axis indicating features of the plurality of images;
   calculate a feature impression value in the feature impression axis determined by the processor, with respect to each of the plurality of images;
   determine a characteristic value that is a characteristic that serves as an index for analyzing or classifying an image, with respect to each of the plurality of images;
   set the feature impression axis determined by the processor, as a first axis;
   set an axis of the characteristic that serves as the index, as a second axis; and
   plot the feature impression values calculated by the processor according to the characteristic values determined by the processor, in an image characteristic region defined by the first axis and the second axis to be displayed in the image characteristic region.

2. The feature impression axis determination system according to claim 1, wherein the processor being further configured to:
   plot the standard impression values determined by the processor in the standard region to be displayed in the standard region.

3. The feature impression axis determination system according to claim 2, wherein the processor being further configured to:
   display the feature impression axis determined by the processor in the standard region in which the standard impression values are plotted and displayed by the processor.

4. The feature impression axis determination system according to claim 1, wherein the index is an image quality or imaging date and time.

5. The feature impression axis determination system according to claim 1, wherein the processor being further configured to:
   extract a first image group corresponding to an aggregate of plots for which a distance between plots of feature impression values is equal to or smaller than a threshold value in the image characteristic region from the plurality of images.

6. The feature impression axis determination system according to claim 5, wherein the processor being further configured to:
   synthesize an image included in the first image group extracted by the processor with a mount image corresponding to an impression, on the feature impression axis, of the first image group extracted by the processor.

7. The feature impression axis determination system according to claim 1, wherein the processor being further configured to:
    extract a second image group having an image quality that is equal to or greater than a threshold value among the plurality of images,
    wherein the processor determines a standard impression value of each image included in the second image group extracted by the processor with respect to the at least two standard impression axes, and
    the processor determines the axis on which the variance of the standard impression values determined by the processor becomes a maximum in the standard region defined by the at least two standard impression axes as a feature impression axis indicating features of the second image group extracted by the processor.

8. A feature impression axis determination method comprising:
    causing a processor to:
    receive a plurality of images;
    determine a standard impression value of each of the plurality of images with respect to at least two standard impression axes;
    determine an axis on which a variance of the standard impression values becomes a maximum in a standard region defined by the at least two standard impression axes as a feature impression axis indicating features of the plurality of images;
    calculate a feature impression value in the feature impression axis, with respect to each of the plurality of images;
    determine a characteristic value that is a characteristic that serves as an index for analyzing or classifying an image, with respect to each of the plurality of images;
    set the feature impression axis as a first axis;
    set an axis of the characteristic that serves as the index as a second axis; and
    plot the feature impression values according to the characteristic values in an image characteristic region defined by the first axis and the second axis to be displayed in the image characteristic region.

9. A non-transitory recording medium storing a computer-readable program that controls a computer of a feature impression axis determination system so that the computer of the feature impression axis determination system executes:
    a process of receiving a plurality of images;
    a process of determining a standard impression value of each of the plurality of images with respect to at least two standard impression axes;
    a process of determining an axis on which a variance of the determined standard impression values becomes a maximum in a standard region defined by the at least two standard impression axes as a feature impression axis indicating features of the plurality of images;
    a process of calculating a feature impression value in the feature impression axis, with respect to each of the plurality of images;
    a process of detellnining a characteristic value that is a characteristic that serves as an index for analyzing or classifying an image, with respect to each of the plurality of images;
    a process of setting the feature impression axis as a first axis;
    a process of setting an axis of the characteristic that serves as the index as a second axis; and
    a process of plotting the feature impression values according to the characteristic values in an image characteristic region defined by the first axis and the second axis to be displayed in the image characteristic region.

* * * * *